United States Patent [19]

Krenzel

[11] 3,864,967

[45] Feb. 11, 1975

[54] TIRE LOAD FORCE VARIATION TESTING SYSTEM
[75] Inventor: Ronald W. Krenzel, Eatontown, N.J.
[73] Assignee: Electronic Associates Inc., West Long Branch, N.J.
[22] Filed: Aug. 20, 1973
[21] Appl. No.: 390,159

[52] U.S. Cl. .................................. 73/146, 328/165
[51] Int. Cl. ......................................... G01m 17/02
[58] Field of Search ............. 73/146; 328/167, 165; 330/107

[56] References Cited
UNITED STATES PATENTS
3,490,277  1/1970  Sanders et al. ..................... 73/146
3,500,681  3/1970  Shively ............................... 73/146

Primary Examiner—Donald O. Woodiel
Attorney, Agent, or Firm—Robert M. Skolnik

[57] ABSTRACT

A tire load force variation testing system for measuring force variation of a tire as a function of rotation. The force applied to the tire for testing is a high static load and a smaller varying force. A force transducer changes this force to an effective A.C. signal superimposed on a D.C. signal level. The resulting signal is applied to a multi-time constant lead filter to suppress the D.C. signal and amplify the A.C. signal. During test the D.C. signal may drift. The lead filter has at least two separate time constants 1) a fast time constant during filter loading, and 2) a slow time constant during tire test to permit tracking of any D.C. voltage drift that may occur.

9 Claims, 3 Drawing Figures

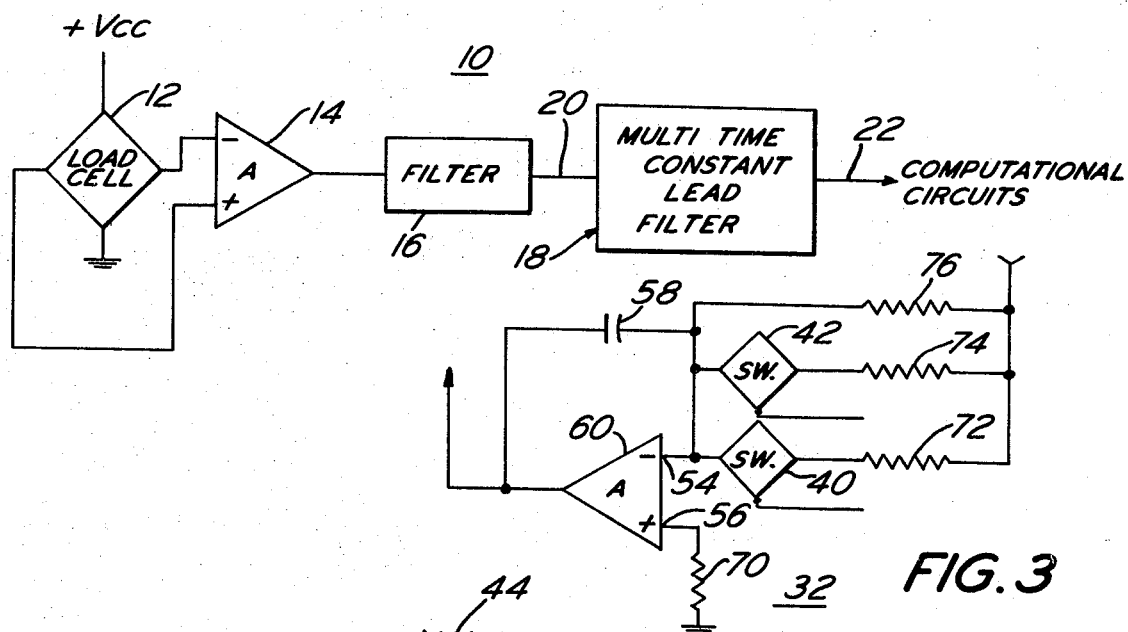
FIG. 1
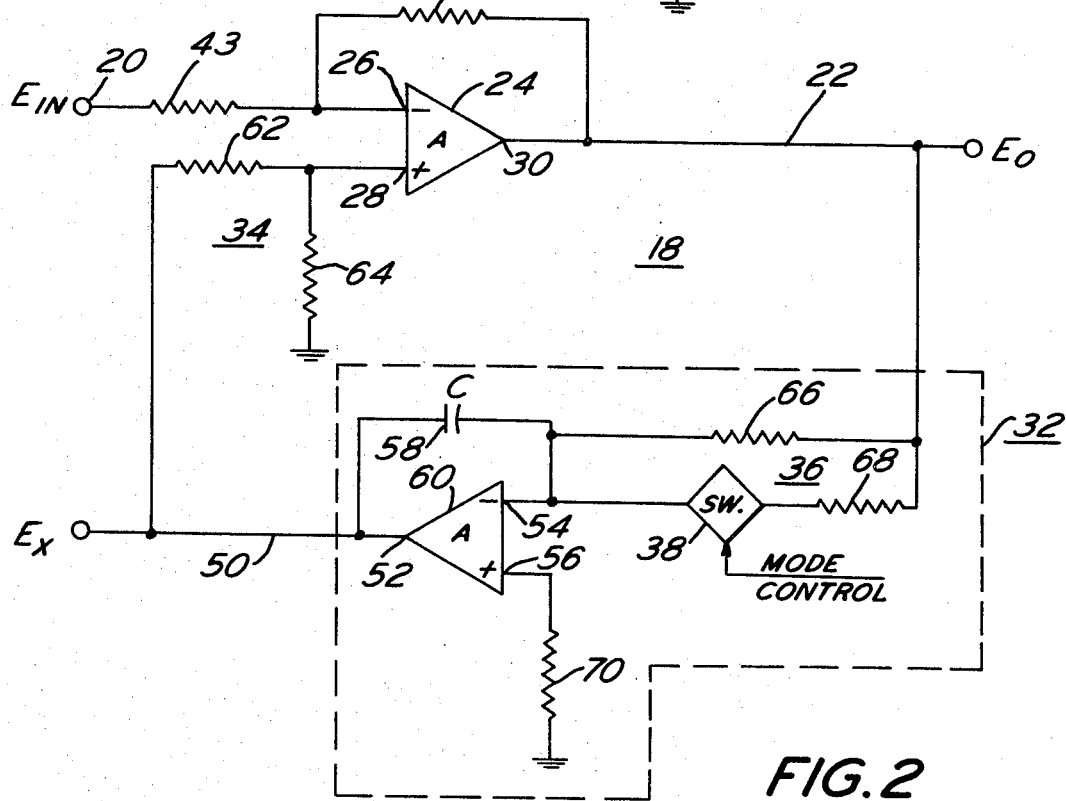
FIG. 3
FIG. 2

3,864,967

TIRE LOAD FORCE VARIATION TESTING SYSTEM

BACKGROUND OF THE INVENTION

1. Field of the Invention

This invention pertains to the field of tire load force variation testing systems. In particular, this invention relates to providing a multi-time constant lead filter in tire testing systems in order to compensate for signal drift.

2. Prior Art

Tire test systems to measure force variation as a function of tire rotation are known in the art. However, such prior systems employ track and store type zero suppression circuitry to eliminate the D.C. signal and amplify the varying force signal. In such prior systems a feedback integrating amplifier having a predetermined input resistance integrates an output signal from an amplifier. When the integrating amplifier has been loaded, the input resistance is taken out of the circuit and the integrating amplifier discharges at its last output value. However, in some cases, the D.C. voltage may drift. In the prior systems, the drift cannot be compensated for in the suppression circuit and causes a D.C. offset voltage equal to the drift voltage from the time the input resistance has been taken out of the circuit. Further, this offset voltage is amplified by the gain of the zero suppression circuit and is transmitted to the computational circuits possibly resulting in force reading inaccuracies. The inaccuracies are a function of time and the longer a tire is tested, the greater the errors. Thus force readings taken on prior art systems may be wholly inaccurate and dependent upon drift rate and negate the entire purpose of the test. Additionally, in prior systems, excessive drift may cause saturation of follow on computational circuits which will cause termination of the test without providing accurate force variation readings.

SUMMARY OF THE INVENTION

A zero suppression system having an input with an input signal being applied thereto. An amplifier has first and second input terminals and an output terminal connected to the system output. An integration circuit is connected between the system output and the second input terminal of the amplifier circuit for charging up to a D.C. component of the input signal at the integrator output, eliminating the D.C. component at the suppression output. The integration means includes a time constant variation means for changing the initial time constant to a substantially slower time constant. Thus as the input applied D.C. component varies or drifts, a correspondingly varying suppression signal is produced.

BRIEF DESCRIPTION OF THE DRAWINGS

FIG. 1 is a flow block diagram of the tire force testing system;

FIG. 2 is a circuit diagram of the zero suppression system of the tire test system; and, FIG. 3 is a circuit diagram of a portion of the suppression system showing an embodiment of the invention.

DETAILED DESCRIPTION

Referring now to FIG. 1, there is shown an electrical block diagram of tire load force variation system 10 for measuring force variations of a tire under test. In general, during force testing a tire is mounted on a rim and inflated to a predetermined pressure. A roadwheel is applied to the tire to simulate road forces applied to the tire during operation. The tire (or roadwheel) is then rotated which simulates movement of the tire over a roadway. Thus, two forces are present during the test: 1) an essentially constant force between the tire and the roadwheel representing the static force balance between the tire and the roadwheel, and 2) a varying force between the tire and roadwheel as the tire rotates.

As will later be described, system 10 suppresses the static or constant load force and amplifies the varying load force while minimizing the constant load force drift that may occur during test. In general, system 10 converts the combined force (constant and varying force as a function of tire rotation) to an electronic signal. This signal is amplified, filtered and then inserted into a zero suppression system which substantially eliminates the static load force voltage offset and amplifies the lower varying load force voltage offset. This result is then passed to computational circuits for calculating load forces and variations thereof resulting from the tire testing.

As shown in FIG. 1, the tire under force loading is in communication with a standard force transducer or load cell 12. Transducer 12 is applied to the rotating tire via the roadwheel and translates the applied force into a voltage signal having a large D.C. component (corresponding to the previously described static load) a varying voltage signal (corresponding to the varying force load) defining an effective A.C. voltage superimposed on the D.C. component. In the normal manner, a voltage +Vcc is supplied to load cell 12 and a differential signal output is produced. Load cell 12 is well known in the art; one of which having been used successfully is a Lebow Model No. 6443.

The signal output from transducer 12 is applied to instrument amplifier 14 for amplifying the signal from load cell 12. Amplifier 14 may have a gain in the order of 300 and may be an amplifier manufactured by Electronic Associates Inc. (EAI), West Long Branch, N.J. Model No. 6.0878. The amplified signal is applied through a filter 16 connected in series with amplifier 14 which eliminates noise from the now amplified signal. Filter 16 eliminates high frequency noise or other signals extraneous to the tire testing system such as machine resonance which would interfere with the force computations. Filter 16 is well known in the art, one of such having been used successfully is the EAI filter Model No. 12.1792. The voltage signal leaving filter 16 is an amplified and filtered signal substantially representative of the load force being applied to the tire under test.

The voltage signal is applied to input line 20 of multiconstant lead filter or zero suppression system 18 shown in detail in FIG. 2. Under ideal conditions, at input 20, voltage signal $E_{in}$, is composed of: (1) a constant D.C. signal and (2) a varying voltage signal having higher order harmonics. The constant DC signal would be representative of a static tire load force being constant throughout a tire test. However, in some tire testing the static tire load drifts due to tire expansion or other reasons. This causes a D.C. voltage drift which causes a D.C. offset voltage equal to the drift voltage which would be amplified by the gain of prior art zero suppression circuits. Zero suppression system 18 of the present invention provides a time constant variation circuit to change the time constant of system 18 during tire test in order to minimize the D.C. drift voltage offset that occurs.

System 18 includes amplifier means or differential amplifier 24 having a first input terminal 26, a second input terminal 28 and an output 30. Input signal $E_{in}$ is applied by way of a resistor 43 (of resistance value $R_1$) to terminal 26. A feedback resistor 44 (of resistance value $R_2$) is coupled between terminals 30 and 26. The gain of amplifier 24 taken above is known to be:

$$G_1 = (-E_0/E_{in}) = (-R_2/R_1) \qquad (1)$$

where:
  $G_1$ = Gain of circuit only taking amplifier 24 considering only inverting input into calculation (dimensionless)
  $E_0$ = Output voltage (volts)
  $E_{in}$ = Input voltage (volts)
  $R_2, R_1$ = ohms In order to eliminate the D.C. bias, integrator 32 is added in a feedback loop. Integrator 32 (dotted block) is connected between output 30 of amplifier 24 by way of conductor 22 and input terminal 28. Integrator 32 produces a voltage signal $E_x$ on line 50 taken from output 52 of amplifier 60 as shown in FIG. 2. In general, integrator 32, integrates the signal from line 22 until the output of amplifier 30 is zero. At this point in time integrator 32 will cease integrating and if the gain from $E_{in}$ and $E_x$ are equal, the voltage output of integrator 32 will equal the $E_{in}$ applied on line 20.

The value of the voltage signal $E_x$ passing from integrator 32 is applied by way of a divider circuit 34 to input 28 of amplifier 24. Resistor 62 (having a value of $R_3$) of divider circuit 34 is connected between line 50 and the junction of resistor 64 (having a resistance value of $R_4$) and input 28. The other side of resistor 64 is connected to ground. The gain of the voltage signal leaving integrator 32 is further affected by resistor elements 43 and 44 (resistance values $R_1$ and $R_2$) to yield a gain of:

$$G_2 = E_x/E_0 = (R_4/[R_3 + R_4]) \cdot ([R_1 + R_2]/R_1) \qquad (2)$$

where:
  $G_2$ = Gain of voltage $E_x$

Specifically, integrator 32 is connected between output 30 and input 28 of amplifier 24 by way of divider circuit 34. The input resistance to amplifier 60 includes resistance elements 66 and 68 (having resistance valves $R_6$ and $R_5$ respectively) connected in parallel with switch 38 closed and connected to input terminal 54. A second input terminal 56 of amplifier 60 is connected to ground through resistor 70 as shown in FIG. 2. Capacitor 60 (having a capacitive value of C) is connected between terminals 54 and 52. The integration rate of integrator 32 is determined by the input resistance (elements 66 and 68 in parallel with switch 38 closed) and capacitor 58. This would result in a time constant equal to the value of capacitor 58 multiplied by the parallel resistance value of resistors 66 and 68 with switch 38 closed. The filter circuitry 18 of the present invention provides for time constant variation mechanism 36 included within integrator 32 for permitting changes in the time constant at predetermined times.

In the embodiment shown in FIG. 2, suppression circuit 18 has the capability of having two time constants. First resistor 68 having a resistance value ($R_5$) substantially lower than second resistor 66 with a value $R_6$ is connected in series with switch 38. When switch member 38 is closed or on, it is seen that the input resistance of integrator 32 becomes the parallel connection of elements 68 and 66. In this state, circuit 18 functions as a lead circuit or first order high pass filter having an initial time constant. When switch 38 is open or off, the input resistance of integrator 32 becomes equivalent to the resistance value $R_6$ resulting in a second time constant. Since the value $R_5$ is substantially less than the resistance value $R_6$ it is understood that the second time constant is substantially slower than the initial time constant.

In other words, during the integration amplifier loading phase, switch member 38 will be closed resulting in a parallel connection of resistors 66 and 68. Further, it is assumed that the resistance value of resistor 66 is substantially greater than that of 68. Thus input resistance for integrator 32 approaches the value $R_5$ since the resistance value of a large and small resistor in parallel connection approaches that of the small resistance valve. The time constant during loading of integrator 32 is short having a high integration rate. When switch member 38 is opened during test of the tire, the resistor 68 is taken out of circuit 18. Therefore, the basic input resistance is equal to the value $R_6$. This results in a second time constant which is comparatively long with respect to the intitial time constant and has a relatively slow integration rate. Thus, circuit 18 has an initial time constant during the loading phase and a second time constant during tire testing.

Assuming that switch 38 is closed, the initial time constant and consequently operation of circuit 18 may be seen to be in general derived from the basic transfer function of a lead circuit:

$$E_0 = K(ST_1)/(ST_1 + 1) E_{in} \qquad (3)$$

where:
  $E_0$ = Output voltage
  $K$ = Gain factor of lead circuit
  $S$ = Laplace Transform operator
  $T_1$ = Initial time constant
  $E_{in}$ = Input voltage Referring now to circuit 18 in particular, it is seen that $E_0$ is equal to the inverted gain of amplifier 24 (from equation 1) multiplied by $E_{in}$ to be algebraically added to $G_2$ (of equation 2) multiplied by $E_x$. Thus:

$$E_0 = -G_1 E_{in} + G_2 E_x = -(R_2/R_1) E_{in} + (R_4)/(R_3 + R_4)(R_1 + R_2)/(R_1) E_x \qquad (4)$$

which may be written as:

$$E_0 = -(R_2/R_1) E_{in} + K_1 K_2 E_x \qquad (5)$$

where:
  $K_1 = R_4/(R_3 + R_4)$
  $K_2 = (R_1 + R_2)/R_1$

Now the value of the voltage $E_x$ with respect to the output voltage $E_0$ may be written as a standard transfer function with $R_5$ and $R_6$ in parallel connection:

$$E_x = -E_0 \, 1 \, SC[R_5 R_6]/R_5 + R_6 \qquad (6)$$

By placing equation (6) into equation (5) and algebraically manipulating the results it is found:

$$E_0/E_{in} = -(R_2/R_1) [SC (R_x/K_1 K_2)]/[SC (R_x/K_1 K_2) + 1] \quad (7)$$

where:

$$R_x = R_5 R_6/R_5 + R_6$$

It is now clearly seen that equation (7) is in the same form as equation (3) and that the initial time constant is equal to:

$$T_1 = CR_x/K_1 K_2 = [C(R_5 R_6/R_5 + R_6)]/(K_1 K_2) \quad (8)$$

where the value of $R_5$ is very much less than $R_6$, the initial time constant may approximate:

$$T_1 \doteq C R_5/K_1 K_2 \quad (9)$$

where:

$$R_5 << R_6$$

Thus equations (8) and (9) show derived values for the initial time constant when switch 38 is closed. Similarly, when switch 38 is open or off, it is seen that resistor 68 is taken out of the network. Thus a second time constant $T_2$ may be derived following the outline of equations (3) – (8) with exception that:

$$R_x = R_6 \quad (10)$$

Thus, the second time constant of circuit 18 may be written:

$$T_2 = (C R_6/K_1 K_2) \quad (11)$$

Therefore, equations (11) and (8) now show circuit 18 as having two time constants which permit circuit 18 to track any D.C. load drift.

An embodiment of the present invention is shown in FIG. 3 where integrator 32 now inlcudes three separate resistors 72, 74 and 76 having resistance values $R_7$, $R_8$ and $R_9$ respectively connected in parallel to form the input resistance. As seen, switches 40 and 42 are connected in series with resistors 72 and 74 respectively and are opposingly connected to terminal 54. In may be assumed that the resistance value of 72 is substantially less than the resistance value of 74 and the value of 74 is less than 76. Then in an analogous manner to that shown for the embodiment of FIG. 2, this circuit provides three different time constants. These time constants may be associated with (1) a very fast initial time constant during loading with switches 40 and 42 closed or on, (2) an intermediate time constant between loading and test with switch 40 opened, and (3) a relatively long time constant during test with both switches 40 and 42 opened. It is to be understood that if it is desired to eliminate the active circuit characteristics during calibration, a third switch may be placed in series with resistor element 76.

What is claimed is:

1. A tire load force variation system for measuring force variation of a tire as a function of rotation comprising:
   a. load cell means applied to said rotating tire for transducing a force to a voltage signal having a D.C. component and an effective A.C. voltage signal superimposed thereon;
   b. amplifier means connected in series to said load cell means for amplifying said voltage signal;
   c. filter means connected in series to said high gain amplifier means for eliminating noise from said amplified voltage signal; and
   d. lead filter means connected in series to said filter means for suppressing said D.C. component of said voltage signal said lead filter means including means for varying said filter time constant for compensating for drift of said D.C. component voltage signal during tire testing.

2. The time load force variation system as recited in claim 1 where said lead filter means includes amplifier means having first and second input terminals, said voltage signal being applied to said first input terminal; and integration means for generating a compensating signal connected to said second input terminal.

3. The tire load force variation system as recited in claim 2 including integration means connected to an output of said amplifier means and to said second input terminal for charging up to said D.C. component of said voltage signal, said integration amplifier means including time constant variation means for changing an initial time constant to a slower time constant.

4. The tire load force variation system as recited in claim 3 where said time constant variation means comprises a plurality of resistance means connected in parallel each to the other, said resistance means being switchable for varying said time constant.

5. The tire load force variation system as recited in claim 4 where said plurality of resistance means comprises a plurality of resistor elements, each of said resistor elements having a discrete resistance value.

6. The tire load force variation system as recited in claim 5 where each of said resistance values of each of said resistor elements is different each with respect to the other.

7. The tire load force variation system as recited in claim 4 where said time constant variation means includes:
   a. a first resistor having a resistance value substantially lower than any of said other plurality of resistance means;
   b. a first switch means connected in series to said first resistor; and,
   c. mode control means for turning on said first switch means to provide said initial time constant.

8. The tire load force variation system as recited in claim 4 where said time constant variation means includes:
   a. a first and second resistor element connected in parallel each to the other, said first resistor element having a resistance value substantially lower than said second resistor element; and
   b. a first switch means connected in series to said first resistor element for changing said time constant from an initial interval to a final interval.

9. The tire load force variation system as recited in claim 4 where said time constant variation means includes:
   a. a set of resistor elements comprising a first, second and third resistor element, said first resistor element having a resistance value substantially lower than said second resistor element, said second resistor element having a resistance value substantially lower than said third resistor element; and
   b. a set of switch means comprising a first and second switch connected in series to said first and second resistor elements respectively for changing said time constant from an initial interval to an intermediate interval to a final interval.

* * * * *